United States Patent
Ham

(10) Patent No.: US 11,634,120 B2
(45) Date of Patent: Apr. 25, 2023

(54) DRIVER ASSISTANCE SYSTEM AND DRIVER ASSISTANCE METHOD

(71) Applicant: HL MANDO CORPORATION, Pyeongtaek-si (KR)

(72) Inventor: Seunggeun Ham, Suwon-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 102 days.

(21) Appl. No.: 17/241,337

(22) Filed: Apr. 27, 2021

(65) Prior Publication Data

US 2021/0331691 A1    Oct. 28, 2021

(30) Foreign Application Priority Data

Apr. 28, 2020   (KR) .................. 10-2020-0051174

(51) Int. Cl.
*B60W 50/14*    (2020.01)
*B60W 30/08*    (2012.01)
(Continued)

(52) U.S. Cl.
CPC ............ *B60W 30/08* (2013.01); *B60W 10/18* (2013.01); *B60W 30/09* (2013.01); *B60W 50/14* (2013.01);
(Continued)

(58) Field of Classification Search
None
See application file for complete search history.

(56) References Cited

U.S. PATENT DOCUMENTS 9,120,484 B1 *   9/2015   Ferguson ............. G05D 1/0212
9,260,095 B2 *   2/2016   Chundrlik, Jr. ........... B60T 7/22
(Continued)

FOREIGN PATENT DOCUMENTS

CN    205589100 U   *  9/2016
CN    107683219 A   *  2/2018   ........... B60K 17/344
(Continued)

OTHER PUBLICATIONS

Office Action issued in corresponding Korean Patent Application No. 10-2020-0051174, dated Jun. 10, 2021.

*Primary Examiner* — Kevin R Steckbauer
(74) *Attorney, Agent, or Firm* — Morgan, Lewis & Bockius LLP

(57) ABSTRACT

A driver assistance system that notifies the driver of the braking information of the preceding vehicle or improves the sensitivity of the emergency braking system if the brake lamp of the preceding vehicle is failed includes: a first sensor mounted in a vehicle, having a front field of view of the vehicle, and configured to acquire a front image data; a second sensor selected from a group consisting of a radar sensor and a lidar sensor, mounted in the vehicle, having a front field of sensing of the vehicle, and configured to acquire a front detection data; and a controller including a processor configured to process the front image data and the front detection data, and the controller is configured to: detect a velocity of the preceding vehicle travelling in front of the vehicle and a brake lamp of the preceding vehicle in response to processing the front image data and the front detection data; and determine whether the brake lamp of the preceding vehicle is failed based on the velocity of the preceding vehicle and a lighting of the brake lamp of the preceding vehicle.

20 Claims, 7 Drawing Sheets

(51) Int. Cl.
*G06V 20/56* (2022.01)
*B60W 30/09* (2012.01)
*G06V 20/58* (2022.01)
*B60W 10/18* (2012.01)

(52) U.S. Cl.
CPC ............ *G06V 20/56* (2022.01); *G06V 20/584* (2022.01); *B60W 2050/146* (2013.01); *B60W 2420/42* (2013.01); *B60W 2420/52* (2013.01); *B60W 2554/404* (2020.02); *B60W 2554/4042* (2020.02); *B60Y 2300/08* (2013.01); *G06V 20/58* (2022.01)

(56) References Cited

U.S. PATENT DOCUMENTS

| | | | | |
|---|---|---|---|---|
| 9,583,003 | B2 * | 2/2017 | Shimizu | G08G 1/166 |
| 10,026,320 | B2 * | 7/2018 | Ryu | G08G 1/166 |
| 10,121,240 | B2 * | 11/2018 | Matsui | G06T 7/001 |
| 10,732,640 | B2 * | 8/2020 | Boulton | G08G 1/0175 |
| 10,744,999 | B2 * | 8/2020 | Jerger | B60W 30/182 |
| 10,909,052 | B2 * | 2/2021 | Won | G06F 3/0679 |
| 2008/0312834 | A1 * | 12/2008 | Noda | B60T 7/22 701/301 |
| 2016/0379350 | A1 * | 12/2016 | Matsui | G06V 20/584 348/125 |
| 2017/0316694 | A1 * | 11/2017 | Ryu | G08G 1/166 |
| 2018/0126978 | A1 * | 5/2018 | Jerger | B60W 10/08 |
| 2019/0317517 | A1 * | 10/2019 | Boulton | B60W 30/09 |
| 2020/0133308 | A1 * | 4/2020 | Raichelgauz | G08G 1/22 |
| 2020/0142841 | A1 * | 5/2020 | Won | G06F 13/1668 |
| 2020/0257473 | A1 * | 8/2020 | Kim | G06F 3/0604 |
| 2020/0298892 | A1 * | 9/2020 | Raichelgauz | G08G 1/096725 |
| 2021/0117131 | A1 * | 4/2021 | Kim | G06F 3/0604 |
| 2021/0221369 | A1 * | 7/2021 | Kashefy | B60Q 1/525 |
| 2021/0331691 | A1 * | 10/2021 | Ham | B60W 30/08 |

FOREIGN PATENT DOCUMENTS

| | | | | |
|---|---|---|---|---|
| CN | 113561973 | A * | 10/2021 | ............ B60W 30/08 |
| CN | 107683219 | B * | 11/2021 | ............ B60K 17/344 |
| CN | 113879325 | A * | 1/2022 | |
| DE | 102016122599 | A1 * | 11/2017 | ............ B60Q 11/00 |
| DE | 102021110526 | A1 * | 10/2021 | ............ B60W 30/08 |
| EP | 3303040 | B1 * | 12/2020 | ............ B60K 17/344 |
| GB | 2538738 | A * | 11/2016 | ............ B60K 17/344 |
| GB | 2548731 | A * | 9/2017 | ............ B60K 23/08 |
| JP | 3872179 | B2 * | 1/2007 | |
| JP | 2008-94377 | A | 4/2008 | |
| JP | 2008094377 | A * | 4/2008 | |
| JP | 2014-31086 | A | 2/2014 | |
| JP | 2014031086 | A * | 2/2014 | |
| JP | 2014109853 | A * | 6/2014 | |
| JP | 5703279 | B2 * | 4/2015 | |
| JP | 2015-212133 | A | 11/2015 | |
| JP | 2018052406 | A * | 4/2018 | |
| JP | 6739871 | B2 * | 8/2020 | |
| KR | 20150076882 | A | 7/2015 | |
| WO | WO-2015159504 | A1 * | 10/2015 | ............ B60C 11/005 |
| WO | WO-2016188775 | A1 * | 12/2016 | ............ B60K 17/344 |

* cited by examiner

DRIVER ASSISTANCE SYSTEM AND DRIVER ASSISTANCE METHOD

CROSS-REFERENCE TO RELATED APPLICATION

This application is based on and claims priority under 35 U.S.C. § 119 to Korean Patent Application No. 10-2020-0051174, filed on Apr. 28, 2020 in the Korean Intellectual Property Office, the disclosure of which is incorporated herein by reference.

BACKGROUND

1. Technical Field

The present disclosure relates to a driver assistance system, and more particularly, to a driver assistance system that notifies a driver of braking information of a preceding vehicle when a brake lamp of the preceding vehicle fails, or improves the sensitivity of an emergency braking system.

2. Description of the Related Art

Generally, a vehicle refers to a movement device or transportation device, designed to travel on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

Examples of advanced driver assistance apparatus mounted on vehicles include Forward Collision Avoidance (FCA), Autonomous Emergency Brake (AEB), and Driver Attention Warning (DAW). Such a system is a system for determining the risk of collision with an object in a driving situation of a vehicle, and providing a collision avoidance and warning through emergency braking in a crash situation.

When the brake lamp of the preceding vehicle is failed, it is difficult for the driver to recognize whether or not the preceding vehicle is braking, and thus the risk of occurrence of a collision accident increases.

SUMMARY

For the above reasons, an aspect of the present disclosure is to provide a driver assistance system and a driver assistance method capable of reducing the risk of a collision accident by determining whether a brake lamp of a preceding vehicle is failed and taking appropriate measures.

Therefore, it is an aspect of the present disclosure to provide a driver assistance system including: a first sensor mounted in a vehicle, having a front field of view of the vehicle, and configured to acquire a front image data; a second sensor selected from a group consisting of a radar sensor and a lidar sensor, mounted in the vehicle, having a front field of sensing of the vehicle, and configured to acquire a front detection data; and a controller including a processor configured to process the front image data and the front detection data, and the controller is configured to: detect a velocity of the preceding vehicle travelling in front of the vehicle and a brake lamp of the preceding vehicle in response to processing the front image data and the front detection data; and determine whether the brake lamp of the preceding vehicle is failed based on the velocity of the preceding vehicle and a lighting of the brake lamp of the preceding vehicle.

The controller may be configured to determine that the brake lamp of the preceding vehicle is failed if the brake lamp of the preceding vehicle is not lit while the velocity of the preceding vehicle is reduced to a change amount equal to or greater than a preset change amount.

The controller may be configured to display a braking operation of the preceding vehicle by controlling the display of the vehicle if it is determined that the brake lamp of the preceding vehicle is failed and the velocity of the preceding vehicle is reduced to a change amount equal to or greater than a preset change amount.

The controller may be configured to determine a time to collision (TTC) between the vehicle and the preceding vehicle, transmit an emergency braking signal to a braking system of the vehicle when the TTC is less than a preset time, and set the preset time to be larger if it is determined that the brake lamp of the preceding vehicle is failed.

The controller may be configured to determine a time to collision (TTC) between the vehicle and the preceding vehicle, output a collision warning image by controlling a display of the vehicle when the TTC is less than a preset time, and set the preset time to be larger if it is determined that the brake lamp of the preceding vehicle is failed.

The controller may be configured to determine a time to collision (TTC) between the vehicle and the preceding vehicle, output a collision warning sound by controlling a speaker of the vehicle when the TTC is less than a preset time, and set the preset time to be larger if it is determined that the brake lamp of the preceding vehicle is failed.

The controller may be configured to detect a vehicle number of the preceding vehicle in response to processing the front image data and store the vehicle number of the preceding vehicle if it is determined that the brake lamp of the preceding vehicle is failed.

The controller may be configured to determine that the brake lamp of the preceding vehicle is failed if the stored vehicle number of the preceding vehicle matches the vehicle number of the preceding vehicle detected in response to processing the front image data.

The controller may be configured to detect a velocity of the preceding vehicle in response to processing the front detection data, and detect whether the brake lamp of the preceding vehicle is lit in response to processing the front image data.

It is another aspect of the present disclosure to provide a driver assistance method including: acquiring a front image data and a front detection data of a vehicle; processing the front image data and the front detection data; detecting a velocity of the preceding vehicle travelling in front of the vehicle and a brake lamp of the preceding vehicle in response to processing the front image data and the front detection data; and determining whether the brake lamp of the preceding vehicle is failed based on the velocity of the preceding vehicle and a lighting of the brake lamp of the preceding vehicle.

The determining whether the brake lamp of the preceding vehicle is failed based on the velocity of the preceding vehicle and the lighting of the brake lamp of the preceding vehicle may include: determining that the brake lamp of the preceding vehicle is failed if the brake lamp of the preceding vehicle is not lit while the velocity of the preceding vehicle is reduced to a change amount equal to or greater than a preset change amount.

The driver assistance method may further include: displaying a braking operation of the preceding vehicle by controlling the display of the vehicle if it is determined that the brake lamp of the preceding vehicle is failed and the velocity of the preceding vehicle is reduced to a change amount equal to or greater than a preset change amount.

The driver assistance method may further include: determining a time to collision (TTC) between the vehicle and the preceding vehicle; transmitting an emergency braking signal to a braking system of the vehicle when the TTC is less than a preset time, and the transmitting the emergency braking signal to the braking system of the vehicle when the TTC is less than the preset time may include: setting the preset time to be larger if it is determined that the brake lamp of the preceding vehicle is failed.

The driver assistance method may further include: determining a time to collision (TTC) between the vehicle and the preceding vehicle; and outputting a collision warning image by controlling a display of the vehicle when the TTC is less than a preset time, and the outputting the collision warning image by controlling the display of the vehicle when the TTC is less than the preset time may include: setting the preset time to be larger if it is determined that the brake lamp of the preceding vehicle is failed.

The driver assistance method may further include: determining a time to collision (TTC) between the vehicle and the preceding vehicle; and outputting a collision warning sound by controlling a speaker of the vehicle when the TTC is less than a preset time, and the outputting the collision warning sound by controlling the speaker of the vehicle when the TTC is less than the preset time may include: setting the preset time to be larger if it is determined that the brake lamp of the preceding vehicle is failed.

The driver assistance method may further include: detecting a vehicle number of the preceding vehicle in response to processing the front image data; and storing the vehicle number of the preceding vehicle If it is determined that the brake lamp of the preceding vehicle is failed.

The driver assistance method may further include: determining that the brake lamp of the preceding vehicle is failed if the stored vehicle number of the preceding vehicle matches the vehicle number of the preceding vehicle detected in response to processing the front image data.

The detecting a velocity of the preceding vehicle travelling in front of the vehicle and a brake lamp of the preceding vehicle in response to processing the front image data and the front detection data may include: detecting a velocity of the preceding vehicle in response to processing the front detection data, and detecting whether the brake lamp of the preceding vehicle is lit in response to processing the front image data.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
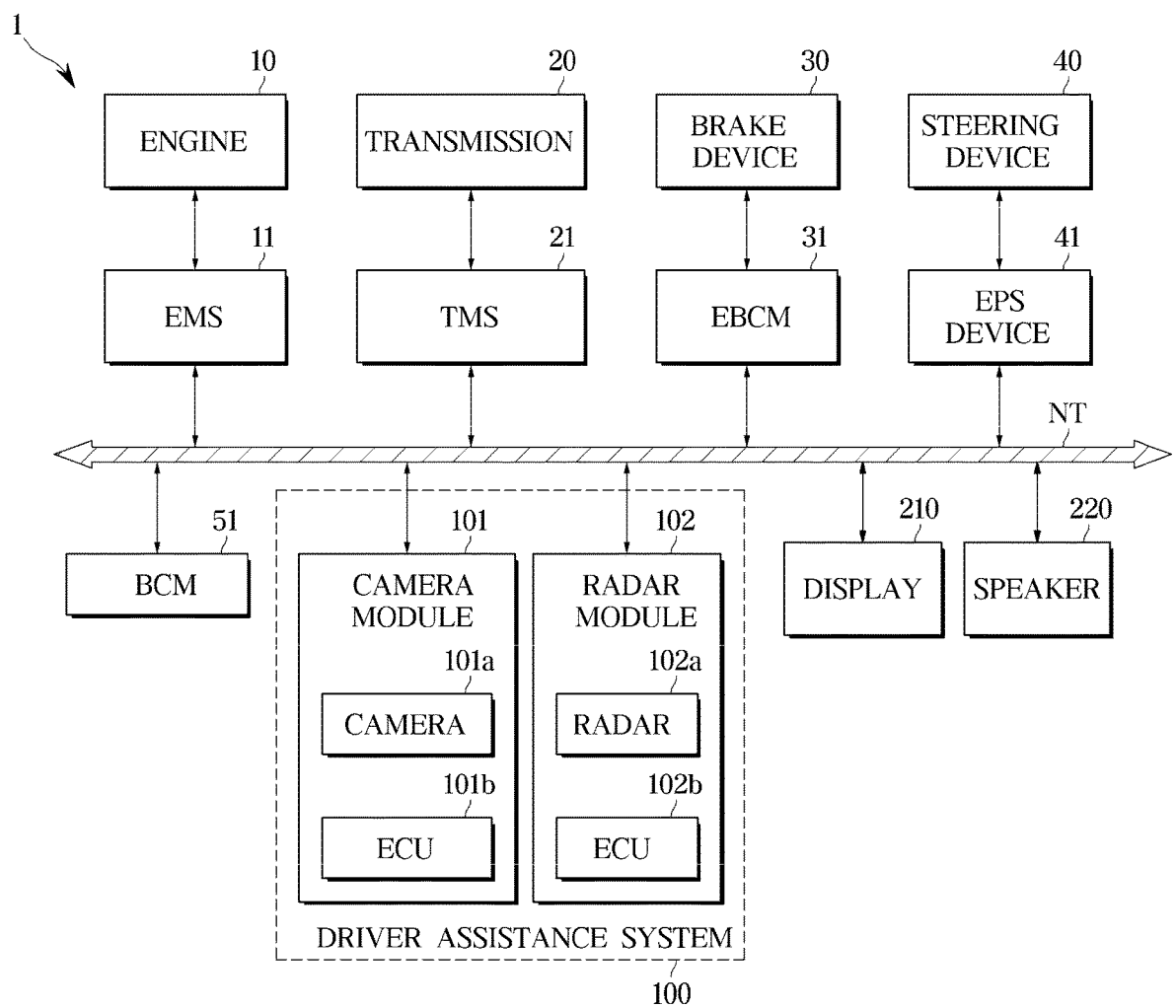
FIG. 1 is a block diagram illustrating a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of electronic parts. For example, the vehicle 1 may include an engine management system (EMS) 11, a transmission control unit (TCU) 21, an electronic brake control module (EBCM) 31, an electronic power steering (EPS) 41, a body control module (BCM) 51, a driver assistance system (DAS) 100 and display 210, and speaker 220.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels detected at a time of braking the vehicle 1 (anti-lock braking systems: ABS). The EBCM 31 may selectively release braking of the wheels in response to over-steering and/or under-steering detected at a time of steering the vehicle 1 (electronic stability control: ESC). In addition, the EBCM 31 may temporarily brake the wheels in response to a slip of the wheels detected at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-velocity travelling or parking and the steering force is increased during high-velocity travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The DAS 100 may assist the driver in manipulating (driving, braking, and steering) the vehicle 1. For example, the DAS 100 may detect a surrounding environment of the vehicle 1 (e.g., another vehicle, a pedestrian, a cyclist, a lane, and the like), and control driving and/or braking and/or steering of the vehicle 1 in response to the detected environment.

The DAS 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The DAS 100 includes a camera module 101 that acquires image data of the surrounding of the vehicle 1 and a radar module 102 that acquires object data of the surrounding of the vehicle 1. The camera module 101 may include a camera 101*a* and an electronic control unit (ECU) 101*b*, and photograph at least one of the front or the lateral side of the vehicle 1 and recognize another vehicle, a pedestrian, a cyclist, a lane, a road sign, and the like. The radar module 102 may include a radar 102*a* and an ECU 102*b*, and acquire a relative position, a relative velocity, and the like of an object of the surrounding of the vehicle 1 (e.g., another vehicle, a pedestrian, a cyclists, and the like).

The driver assistance system 100 is not limited to the one shown in FIG. 1, and may further include a LiDAR that scans around the vehicle 1 and detects an object.

The display 210 may transmit visual information to the driver.

For example, the display 210 may display the braking operation of the preceding vehicle 2 and may output an image warning of a collision with the preceding vehicle 2.

The display 210 for this may be provided inside the vehicle 1 and may include a panel. For example, the display 210 may be provided in the cluster of the vehicle 1, may be provided across the cluster and the center fascia, may be provided on the ceiling inside the vehicle 1, and may be provided on the interior door of the vehicle 1.

In addition, the display 210 may include a head-up display.

The location and number of the display 210 is not limited as long as it is a location and number that may visually transmit information to the driver of the vehicle 1.

The speaker 220 may transmit auditory information to the driver.

For example, the speaker 220 may output a sound warning of a collision with the preceding vehicle 2.

For this purpose, the speaker 220 may be provided inside the vehicle 1, and the speaker may be provided without limitation if it is a position in which the driver of the vehicle 1 may hear the sound output.

The above described electronic parts may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively, through a vehicle communication network NT.

In addition, the driver assistance system 100 may transmit a signal for outputting an image and a signal for outputting a sound to the display 210 and the speaker 220, respectively, through the vehicle communication network NT.

Figure 2:
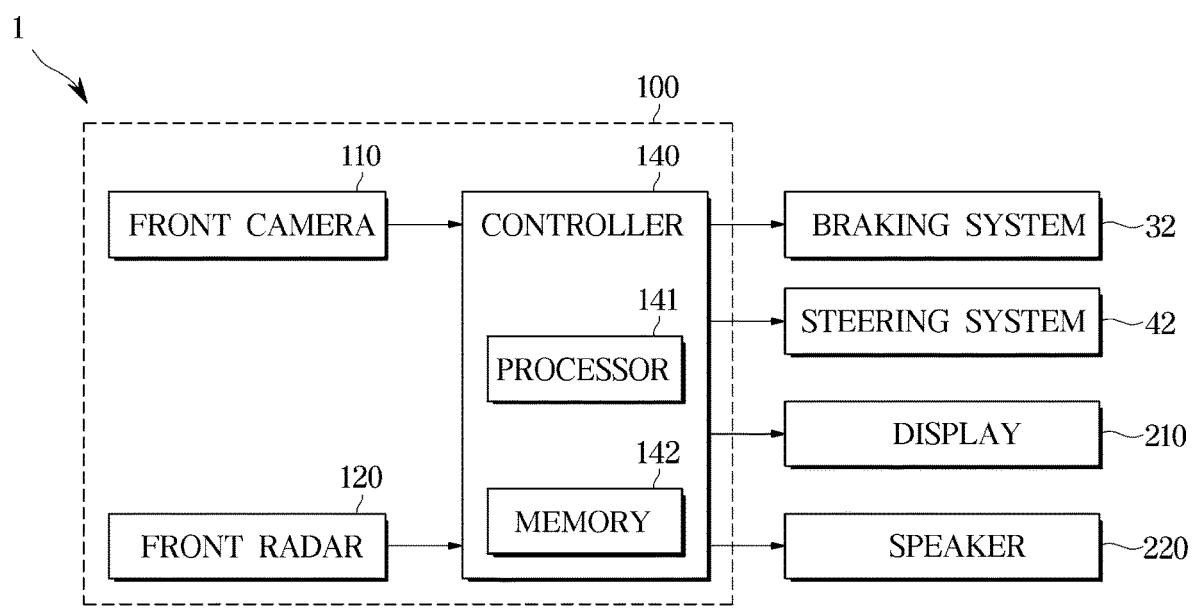
FIG. 2 is a block diagram illustrating a configuration of a driver assistance system according to an embodiment.
Figure 3:
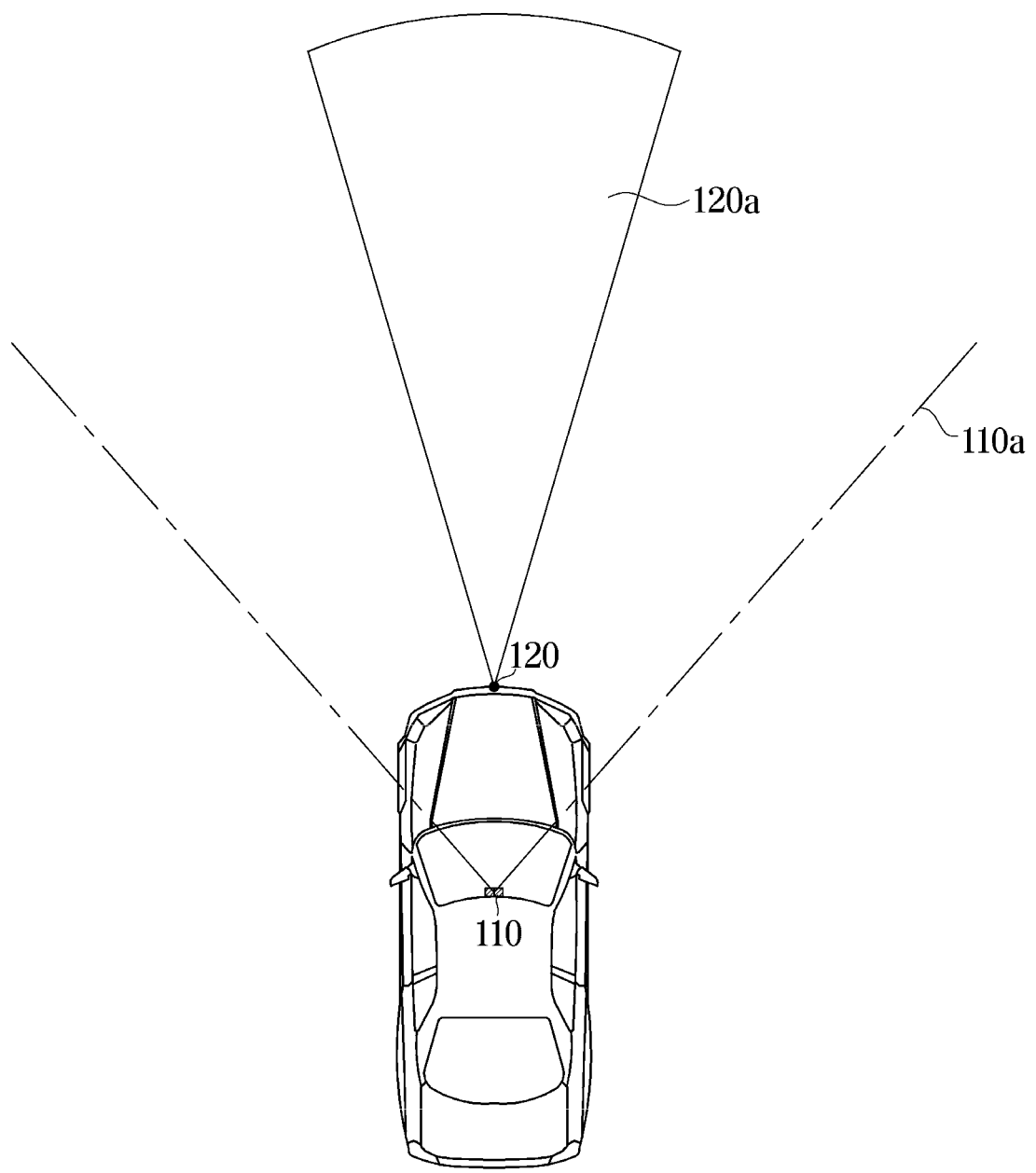
FIG. 3 is a diagram illustrating a camera and a radar included in a driver assistance system according to an embodiment.

FIG. 2 is a block diagram illustrating a configuration of a driver assistance system according to an embodiment. FIG. 3 is a diagram illustrating a camera and a radar included in a driver assistance system according to an embodiment.

Referring to FIG. 2, the vehicle 1 may include a braking system 32, a steering system 42, a DAS 100, a display 210 and speaker 220.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The DAS 100 may include a front camera 110, and a front radar 120.

The front camera 110 may have a field of view 110*a* facing the front of the vehicle 1 as shown in FIG. 3. The front camera 110 may be mounted, for example, on the front windshield of the vehicle 1.

The front camera 110 may photograph the front of the vehicle 1 and acquire image data of the front of the vehicle 1. The image data of the front of the vehicle 1 may include position of preceding vehicle 2, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120a facing the front of the vehicle 1 as shown in FIG. 3. The front radar 120 may be installed, for example, on a grille or bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may determine the relative distance to the object based on the phase difference (or time difference) between the transmission radio waves and the reflected radio waves, and determine the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The controller 140 may include the ECU (101b in FIG. 1) of the camera module (101 in FIG. 1) and/or the ECU (102b in FIG. 1) of the radar module (102 in FIG. 1), and/or an integrated ECU.

The controller 140 includes a processor 141 and a memory 142.

The processor 141 may process the front image data of the front camera 110, and the front radar data of the front radar 120, and generate a braking signal and a steering signal for controlling the braking system 32 and the steering system 42. For example, the processor 141 may include an image signal processor for processing front image data of the front camera 110 and/or a digital signal processor for processing the radar data of the front radar 120 and/or a micro control unit (MCU) for generating a braking signal, a steering signal and a control signal for controlling the display 210 and the speaker 220.

The processor 141 may detect objects in front of the vehicle 1 (e.g., preceding vehicle 2) based on the front image data of the front camera 110 and the front radar data of the front radar 120.

In detail, the processor 141 may acquire position (distance and direction) and relative velocity of the objects in front of the vehicle 1 based on the front radar data of the front radar 120. The processor 141 may acquire position (direction) and type information (for example, whether the object is another vehicle, a pedestrian, or a cyclist) of the object in front of the vehicle 1 based on the front image data of the front camera 110. In addition, the processor 141 allows the object detected by the front image data to match the object detected by the front radar data, and acquires the type information, the position, and the relative velocity of the front objects of the vehicle 1 based on a result of the matching.

The processor 141 may generate a braking signal and a steering signal based on the type information, the position, and the relative velocity of the front objects.

For example, the processor 141 determines a time to collision (TTC) between the vehicle 1 and the front object based on the position (distance) and the relative velocity of the front object, and may transmit a control signal warning the driver of a collision to the display 210 and/or the speaker 220 or may transmit a braking signal to the braking system 32 based on the comparison between the TTC and the predetermined reference time. In response to the TTC less than a predetermined first reference time, the processor 141 may allow a warning to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative velocity of front objects, and warn the driver of a collision or transmit a braking signal to the braking system 32 based on a result of comparing the DTC with distances to the front objects.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the front radars 120, and may temporarily store a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

The DAS 100 is not limited to the one illustrated in FIG. 2, and may further include a LiDAR that scans around the vehicle 1 and detects an object.

A driver assistance method according to an embodiment will be described based on the configuration of the vehicle 1 and the configuration of the driver assistance system 100 described above.

Figure 4:
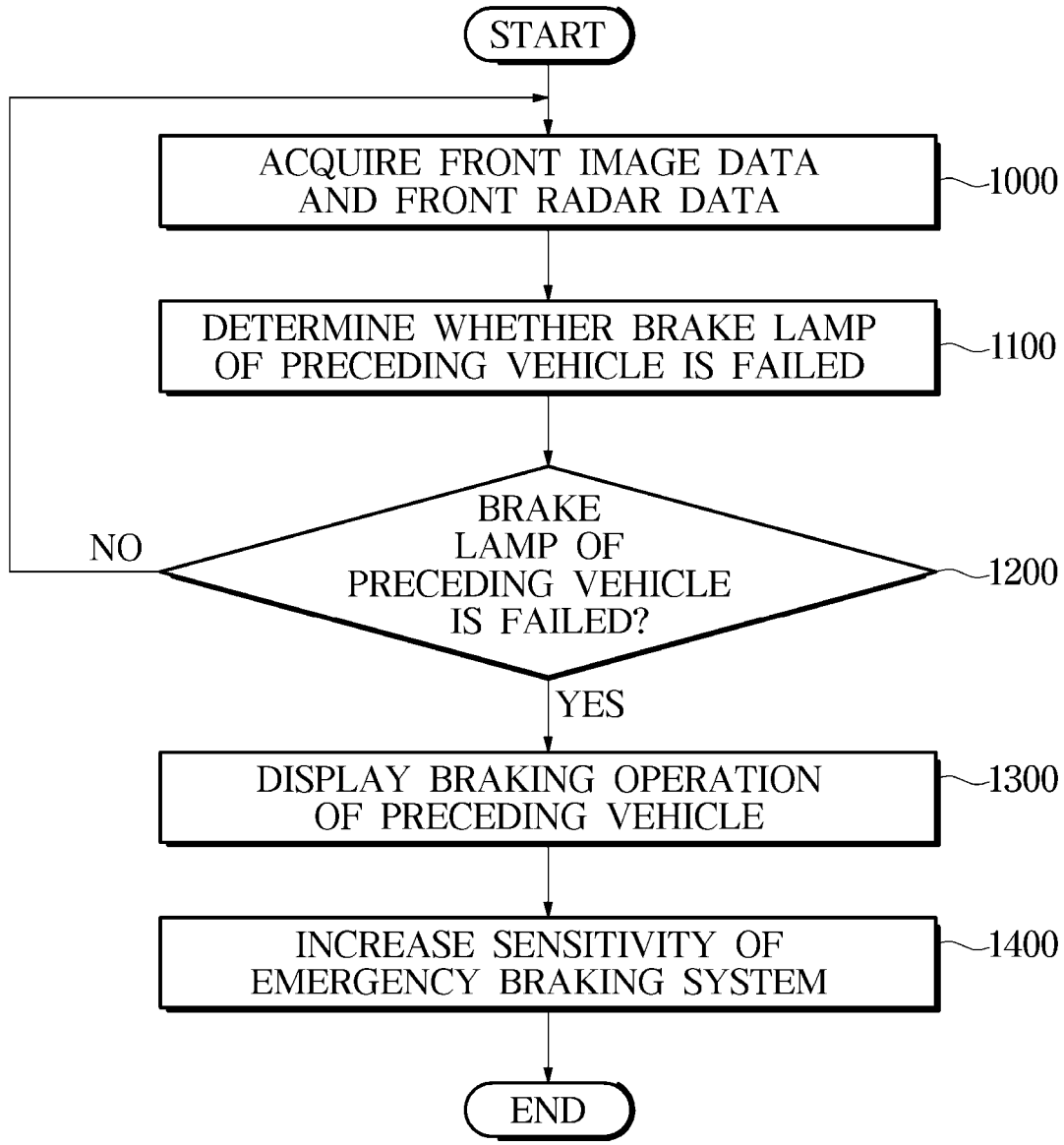
FIG. 4 is a flowchart of a driver assistance method according to an embodiment.
Figure 5:
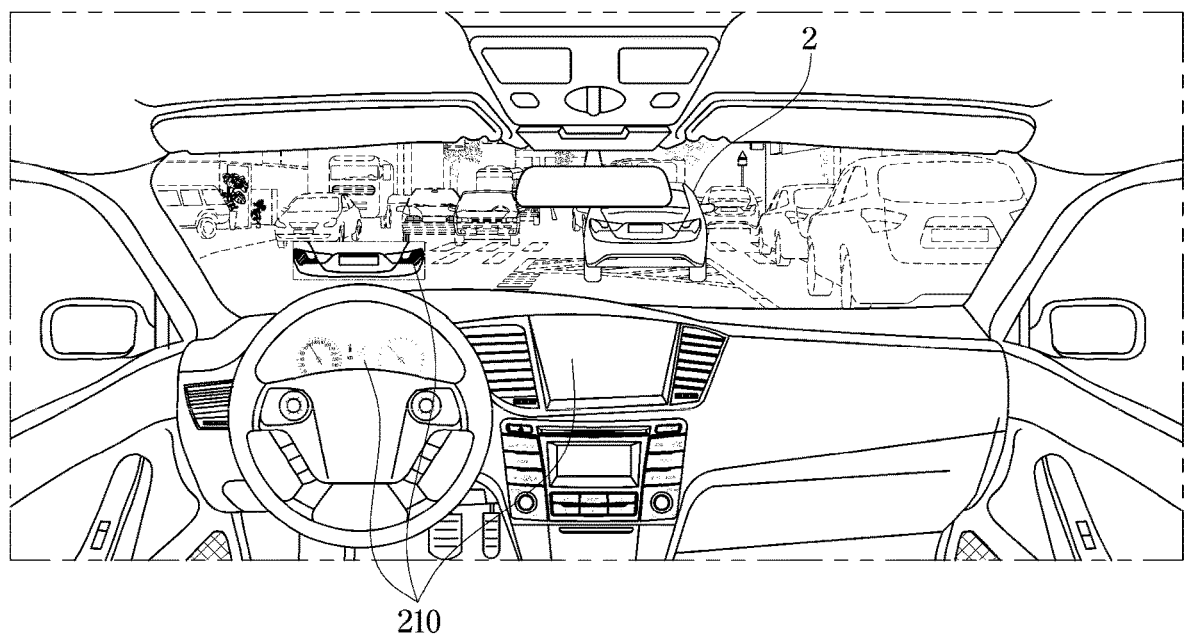
FIG. 5 illustrates a situation in which a brake lamp of a preceding vehicle is failed.
Figure 6:
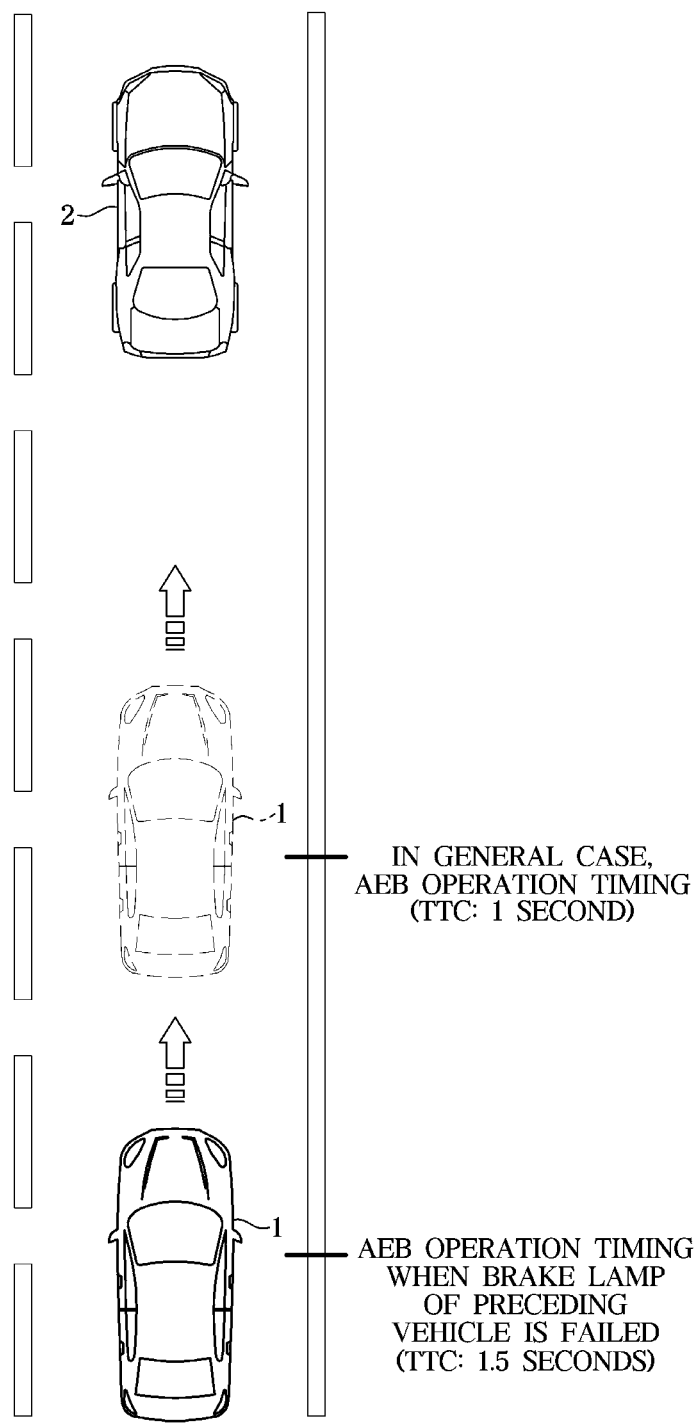
FIG. 6 illustrates a situation in which a brake lamp of a preceding vehicle is failed and an operation timing of an emergency braking system in a general situation.
Figure 7:
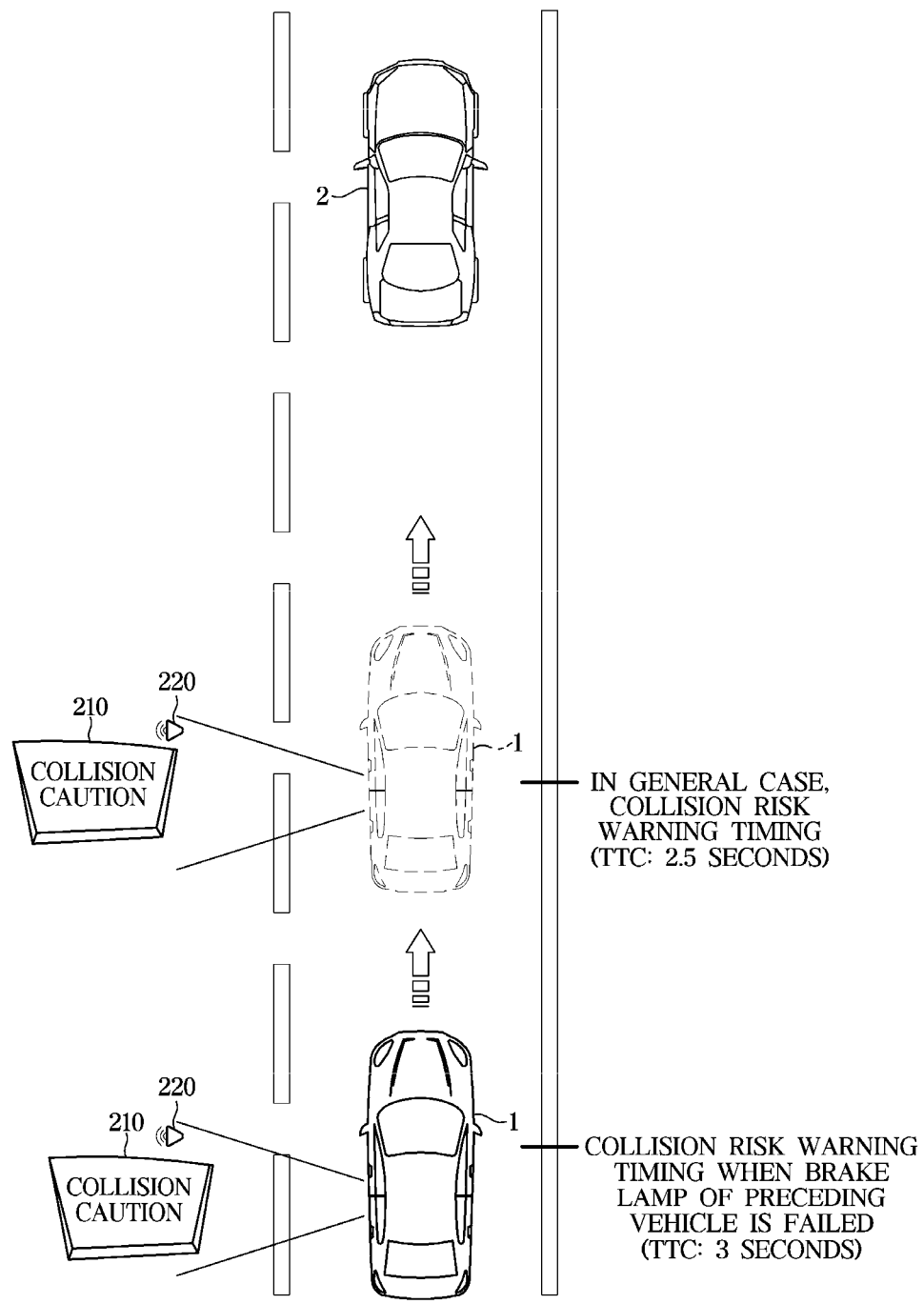
FIG. 7 illustrates a situation in which a brake lamp of a preceding vehicle is failed and a notification timing of a collision warning in a general situation.

FIG. 4 is a flowchart of a driver assistance method according to an embodiment; FIG. 5 illustrates a situation in which a brake lamp of a preceding vehicle is failed; FIG. 6 illustrates a situation in which a brake lamp of a preceding vehicle is failed and an operation timing of an emergency braking system in a general situation; and FIG. 7 illustrates a situation in which a brake lamp of a preceding vehicle is failed and a notification timing of a collision warning in a general situation.

Referring to FIG. 4, the front camera and the front radar may acquire front image data and front radar data of the vehicle 1, respectively (1000).

For convenience of explanation, it is premised that the front radar is used as a sensor for detecting a front object, but a lidar sensor may be used instead of the front radar.

The controller 140 may receive the front image data and the front radar data from the front camera and the front radar, and may process the received front image data and front radar data.

The controller 140 may detect the velocity of the preceding vehicle 2 and the brake lamp of the preceding vehicle 2 in response to processing the front image data and the front radar data.

Thereafter, the controller 140 may determine whether the brake lamp of the preceding vehicle 2 is failed based on the velocity of the preceding vehicle 2 and the lighting of the brake lamp of the preceding vehicle 2 (1100).

For example, if the brake lamp of the preceding vehicle 2 is not lit while the velocity of the preceding vehicle 2 is reduced to a change amount equal to or greater than the preset change amount, the controller 140 may determine that the brake lamp of the preceding vehicle 2 is failed.

In this case, the preset change amount may be set by reflecting the vehicle velocity change amount that may naturally decrease even if the braking device is not operated.

Even if the preceding vehicle 2 does not operate the braking device, the velocity of the preceding vehicle 2 may decrease due to factors such as air resistance and kinetic energy loss due to heat energy generation. Accordingly, the controller 140 may determine that the preceding vehicle 2 operates the braking device only when the velocity of the preceding vehicle 2 is reduced to a change amount equal to or greater than the preset change amount.

Since the greater the velocity of the preceding vehicle 2, the greater the degree of natural deceleration due to air resistance, so the preset change amount may vary according to the velocity of the preceding vehicle 2.

That is, if the brake lamp is not lit even though the preceding vehicle 2 is operating the braking device, the controller 140 may determine that the brake lamp of the preceding vehicle 2 is failed.

Specifically, the controller 140 may detect the velocity of the preceding vehicle 2 in response to processing the front radar data, and determine whether the braking device of the preceding vehicle 2 is operating based on the detected velocity. And, in response to processing the front image data, the controller 140 may determine whether the brake lamp of the preceding vehicle 2 is lit.

Although not shown in the drawing, the controller 140 may detect the vehicle number of the preceding vehicle 2 in response to processing the front image data, and may store the vehicle number of the preceding vehicle 2 if it is determined that the brake lamp of the preceding vehicle 2 is failed.

After that, if the vehicle number of the stored preceding vehicle 2 and the vehicle number of the preceding vehicle 2 detected in response to processing the front image data match, by determining that the brake lamp of the preceding vehicle 2 is failed, the controller 140 may maintain recognition of the preceding vehicle 2 in which the brake lamp is failed.

If it is determined that the brake lamp of the preceding vehicle 2 is failed, the controller 140 may notify the driver of the braking of the preceding vehicle 2 by controlling the display 210 of the vehicle 1 when the preceding vehicle 2 operates the braking device.

Specifically, the controller 140 may display a braking operation of the preceding vehicle 2 by controlling the display 210 of the vehicle 1 if it is determined that the brake lamp of the preceding vehicle 2 is failed and the velocity of the preceding vehicle 2 is reduced to a change amount equal to or greater than a preset change amount (1300).

For example, referring to FIG. 5, the display 210 may display an image in which a brake lamp of an arbitrary vehicle is lit based on a control signal from the controller 140.

In this case, the display 210 may include a head-up display, and the driver may intuitively recognize that the preceding vehicle 2 has operated the braking device by viewing the image output on the head-up display.

FIG. 5 illustrates only the case where the display 210 is a head-up display, but the display 210 may be provided in a cluster or may be provided in an AVN device.

However, the method of displaying the braking operation of the preceding vehicle 2 on the display 210 is not limited thereto, and any method may be used as long as it is a method for notifying the fact that the preceding vehicle 2 has operated the braking device.

In addition, when it is determined that the brake lamp of the preceding vehicle 2 is failed, the controller 140 may increase the sensitivity of the emergency braking system (1400).

As described above, the controller 140 determines the TTC between the vehicle 1 and the preceding vehicle 2, and may transmit an emergency braking signal to the braking system of the vehicle 1 when the TTC is less than a predetermined third reference time.

However, if the brake lamp of the preceding vehicle 2 is failed, the driver of the vehicle 1 does not recognize the braking of the preceding vehicle 2. Therefore, there is a need to transmit an emergency braking signal to the braking system of the vehicle 1 more quickly.

Accordingly, if it is determined that the brake lamp of the preceding vehicle 2 is failed, the controller 140 may transmit an emergency braking signal to the braking system of the vehicle 1 when the TTC is less than a predetermined fourth reference time. In this case, the predetermined fourth reference time may be set to a time greater than the predetermined third reference time.

That is, when it is determined that the brake lamp of the preceding vehicle 2 is failed, the controller 140 may set a larger preset time, which is a reference for transmitting an emergency braking signal.

Referring to FIG. 6, for example, in a general situation, the driver assistance system 100 may transmit an emergency braking signal to the braking system 32 of the vehicle 1 if the TTC is 1 second or less.

However, in a situation in which the brake lamp of the preceding vehicle 2 is failed, the driver assistance system 100 may transmit an emergency braking signal to the braking system 32 of the vehicle 1 if the TTC is 1.5 seconds or less.

As described above, if the brake lamp of the preceding vehicle 2 is failed, the driver assistance system 100 may prevent a collision with the preceding vehicle 2 by generating an emergency braking signal faster than a general situation.

As another example, as described above, if the TTC between the vehicle 1 and the preceding vehicle 2 is less than or equal to a predetermined first reference time, the controller 140 may warn the driver of a collision by controlling the display 210 and/or the speaker 220.

However, if the brake lamp of the preceding vehicle 2 is failed, the driver of the vehicle 1 is not aware of the braking of the preceding vehicle 2, and thus the driver must be warned of the risk of collision more quickly.

Therefore, if it is determined that the brake lamp of the preceding vehicle 2 is failed, the controller 140 may transmit a control signal for warning of a collision to the display 210 and/or the speaker 220 of the vehicle 1 when the TTC is less than the fifth reference time. In this case, the predetermined fifth reference time may be set to a time greater than the predetermined first reference time.

That is, when it is determined that the brake lamp of the preceding vehicle 2 is failed, the controller 140 may set a larger preset time, which is a reference for outputting a collision warning signal.

Referring to FIG. 7, for example, in a general situation, when the TTC is 2.5 seconds or less, the driver assistance system 100 may output a collision warning image by controlling the display 210 of the vehicle 1 or may output a collision warning sound by controlling the speaker 220 of the vehicle 1.

However, in a situation where the brake lamp of the preceding vehicle 2 is failed, when the TTC is 3 seconds or less, the driver assistance system 100 may output a collision warning image by controlling the display 210 of the vehicle 1 or may output a collision warning sound by controlling the speaker 220 of the vehicle 1.

As described above, when the brake lamp of the preceding vehicle 2 is failed, the driver assistance system 100 may warn the driver of a collision in advance by generating a collision warning signal faster than a general situation.

According to an aspect of the present disclosure, even if the brake lamp of the preceding vehicle fails, the risk of a collision with the preceding vehicle may be reduced.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that may be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A driver assistance system comprising:
a first sensor mounted in a vehicle, having a front field of view of the vehicle, and configured to acquire a front image data;
a second sensor selected from a group consisting of a radar sensor and a lidar sensor, mounted in the vehicle, having a front field of sensing of the vehicle, and configured to acquire a front detection data; and
a controller comprising a processor configured to process the front image data and the front detection data,
wherein the controller is configured to:
detect a velocity of the preceding vehicle travelling in front of the vehicle and a brake lamp of the preceding vehicle by processing the front image data and the front detection data;
determine whether the brake lamp of the preceding vehicle is failed based on the velocity of the preceding vehicle and a lighting of the brake lamp of the preceding vehicle; and
in response to determining that the brake lamp of the preceding vehicle is failed, advance a timing of transmitting an emergency braking signal to a braking system of the vehicle and/or a timing of warning a driver of the vehicle of a collision.

2. The driver assistance system according to claim 1, wherein the controller is configured to determine that the brake lamp of the preceding vehicle is failed in response to determining that the brake lamp of the preceding vehicle is not lit while the velocity of the preceding vehicle is reduced to a change amount equal to or greater than a preset change amount.

3. The driver assistance system according to claim 1, wherein the controller is configured to display a braking operation of the preceding vehicle by controlling the display of the vehicle in response to determining that the brake lamp of the preceding vehicle is failed and the velocity of the preceding vehicle is reduced to a change amount equal to or greater than a preset change amount.

4. The driver assistance system according to claim 1, wherein the controller is configured to determine a time to collision (TTC) between the vehicle and the preceding vehicle, transmit the emergency braking signal to the braking system of the vehicle when the TTC is less than a preset time, and
set the preset time to be larger in response to determining that the brake lamp of the preceding vehicle is failed.

5. The driver assistance system according to claim 1, wherein the controller is configured to determine a time to collision (TTC) between the vehicle and the preceding vehicle, output a collision warning image by controlling a display of the vehicle when the TTC is less than a preset time, and
set the preset time to be larger in response to determining that the brake lamp of the preceding vehicle is failed.

6. The driver assistance system according to claim 1, wherein the controller is configured to determine a time to collision (TTC) between the vehicle and the preceding vehicle, output a collision warning sound by controlling a speaker of the vehicle when the TTC is less than a preset time, and
set the preset time to be larger in response to determining that the brake lamp of the preceding vehicle is failed.

7. The driver assistance system according to claim 1, wherein the controller is configured to detect a vehicle number of the preceding vehicle by processing the front image data and store the vehicle number of the preceding vehicle in response to determining that the brake lamp of the preceding vehicle is failed.

8. The driver assistance system according to claim 7, wherein the controller is configured to determine that the brake lamp of the preceding vehicle is failed in response to determining that the stored vehicle number of the preceding vehicle matches the vehicle number of the preceding vehicle detected by processing the front image data.

9. The driver assistance system according to claim 1, wherein the controller is configured to detect a velocity of the preceding vehicle by processing the front detection data, and detect whether the brake lamp of the preceding vehicle is lit by processing the front image data.

10. A driver assistance method comprising:
acquiring a front image data and a front detection data of a vehicle;
processing the front image data and the front detection data;
detecting a velocity of the preceding vehicle travelling in front of the vehicle and a brake lamp of the preceding vehicle by processing the front image data and the front detection data;
determining whether the brake lamp of the preceding vehicle is failed based on the velocity of the preceding vehicle and a lighting of the brake lamp of the preceding vehicle; and
in response to determining that the brake lamp of the preceding vehicle is failed, advancing a timing of transmitting an emergency braking signal to a braking system of the vehicle and/or a timing of warning a driver of the vehicle of a collision.

11. The driver assistance method according to claim 10, wherein the determining whether the brake lamp of the preceding vehicle is failed based on the velocity of the preceding vehicle and the lighting of the brake lamp of the preceding vehicle comprises:
determining that the brake lamp of the preceding vehicle is failed in response to determining that the brake lamp of the preceding vehicle is not lit while the velocity of the preceding vehicle is reduced to a change amount equal to or greater than a preset change amount.

12. The driver assistance method according to claim 10, further comprising:
displaying a braking operation of the preceding vehicle by controlling the display of the vehicle in response to determining that the brake lamp of the preceding vehicle is failed and the velocity of the preceding vehicle is reduced to a change amount equal to or greater than a preset change amount.

13. The driver assistance method according to claim 10, further comprising:
determining a time to collision (TTC) between the vehicle and the preceding vehicle;
transmitting the emergency braking signal to the braking system of the vehicle when the TTC is less than a preset time,
wherein the transmitting the emergency braking signal to the braking system of the vehicle when the TTC is less than the preset time comprises:
setting the preset time to be larger in response to determining that the brake lamp of the preceding vehicle is failed.

14. The driver assistance method according to claim 10, further comprising:
determining a time to collision (TTC) between the vehicle and the preceding vehicle; and
outputting a collision warning image by controlling a display of the vehicle when the TTC is less than a preset time,
wherein the outputting the collision warning image by controlling the display of the vehicle when the TTC is less than the preset time comprises:
setting the preset time to be larger in response to determining that the brake lamp of the preceding vehicle is failed.

15. The driver assistance method according to claim 10, further comprising:
determining a time to collision (TTC) between the vehicle and the preceding vehicle; and
outputting a collision warning sound by controlling a speaker of the vehicle when the TTC is less than a preset time,
wherein the outputting the collision warning sound by controlling the speaker of the vehicle when the TTC is less than the preset time comprises:
setting the preset time to be larger in response to determining that the brake lamp of the preceding vehicle is failed.

16. The driver assistance method according to claim 10, further comprising:
detecting a vehicle number of the preceding vehicle by processing the front image data; and
storing the vehicle number of the preceding vehicle in response to determining that the brake lamp of the preceding vehicle is failed.

17. The driver assistance method according to claim 16, further comprising:
determining that the brake lamp of the preceding vehicle is failed in response to determining that the stored vehicle number of the preceding vehicle matches the vehicle number of the preceding vehicle detected by processing the front image data.

18. The driver assistance method according to claim 10, wherein the detecting a velocity of the preceding vehicle travelling in front of the vehicle and a brake lamp of the preceding vehicle by processing the front image data and the front detection data comprises:
detecting a velocity of the preceding vehicle by processing the front detection data, and detecting whether the brake lamp of the preceding vehicle is lit by processing the front image data.

19. A non-transitory computer-readable medium storing computer-executable instructions when executed by a processor, cause the processor to:
acquire a front image data and a front detection data of a vehicle;
process the front image data and the front detection data;
detect a velocity of the preceding vehicle travelling in front of the vehicle and a brake lamp of the preceding vehicle by processing the front image data and the front detection data;
determine whether the brake lamp of the preceding vehicle is failed based on the velocity of the preceding vehicle and a lighting of the brake lamp of the preceding vehicle; and
in response to determining that the brake lamp of the preceding vehicle is failed, advance a timing of transmitting an emergency braking signal to a braking system of the vehicle and/or a timing of warning a driver of the vehicle of a collision.

20. The non-transitory computer-readable medium of claim 19, further storing instructions, which when executed by the processor, cause the processor to:
determine that the brake lamp of the preceding vehicle is failed in response to determining that the brake lamp of the preceding vehicle is not lit while the velocity of the preceding vehicle is reduced to a change amount equal to or greater than a preset change amount.

* * * * *